No. 697,696. Patented Apr. 15, 1902.
H. F. WATSON.
MACHINE FOR MAKING MICA BOARD.
Application filed Feb. 19, 1901.
(No Model.) 6 Sheets—Sheet 1.

UNITED STATES PATENT OFFICE.

HENRY F. WATSON, OF VALPARAISO, INDIANA, ASSIGNOR OF ONE-HALF TO MILTON A. SNIDER, OF VALPARAISO, INDIANA.

MACHINE FOR MAKING MICA-BOARD.

SPECIFICATION forming part of Letters Patent No. 697,696, dated April 15, 1902.

Application filed February 19, 1901. Serial No. 47,927. (No model.)

*To all whom it may concern:*

Be it known that I, HENRY F. WATSON, a citizen of the United States, and a resident of Valparaiso, in the county of Porter and State of Indiana, have invented certain new and useful Improvements in Machines for Making Mica-Board, of which the following is a specification.

This invention relates to machines for making board or plates from subdivided or disintegrated substances, and relates particularly to machines for making mica-board from disintegrated laminæ of mica.

Mica-board is used at the present time in electrical work for insulating purposes, and large quantities of it are used. Prior to my invention mica-board has almost universally been made by hand by securing disintegrated laminæ of mica together in superposed position by means of a suitable bonding agent until a board or plate of desired thickness was formed. This process is a slow one, the average output of a skilled operator being about nine (9) square feet of board of standard thickness per day and is correspondingly expensive.

The primary object of the invention is to provide a machine adapted to make mica-board which will have a relatively large capacity and will correspondingly reduce the cost of the product.

To this end a machine of my invention consists of the various features, combinations of features, and details of construction hereinafter described and claimed.

In the accompanying drawings a machine of my invention is fully illustrated.

Referring now to the drawings, A designates the frame of the machine, the bed A' of which forms a flat table. As preferably constructed, the bed or table A' is formed by slabs of slate, but any other suitable or desired material may be used.

Revolubly mounted in suitable bearings in the machine-frame at the ends of the bed or table A' are rolls $A^2 A^3$, to which are adjusted a belt or apron $A^4$, the upper lap of which rests upon said bed or table A', thus forming a movable support for the mica delivered from the hoppers, as hereinafter described, during the operation of the machine. The belt or apron $A^4$ may be made of any desired or approved material, as rubber, leather, canvas, or the like, and is of substantially the same width as the exposed upper surface of the bed or table A'.

Supported above the bed or table A' and the belt or apron $A^4$ and extending transversely thereof are hoppers B, which are designed and intended to contain the flakes or laminæ of mica or other comminuted substance, and each of which is provided with means or mechanism adapted to feed or deliver such mica or other substance from said hoppers upon the belt or apron $A^4$ at a desired and substantially uniform rate. The hoppers B are preferably supported in such manner as to be adjustable toward and from the table A' and belt $A^4$. As shown, each of said hoppers is supported upon arms B', pivoted to lugs or brackets $b$ on the machine-frame, so as to be movable toward and from the bed A' and apron $A^4$, the free ends of said arms B' being adjustable toward and from the bed of the machine by means of screws $b'$, threaded through nuts secured to said arms B', the lower ends of said screws resting on the machine-frame. It is obvious that the free ends of said arms B' may be raised or lowered by means of the screws $b'$ to effect adjustment of the hoppers B toward or from the table A' in the manner desired. The means for feeding or delivering the contents of said hoppers B onto the belt or apron $A^4$ are the same for all of the hoppers and are as follows: Formed in the bottom of each hopper B is an opening, and supported beneath each of said hoppers in continuous contact with the edges of the opening therein is a plate C, which is provided with teeth or fingers $c$, which in the direction of their lengths extend substantially across the opening in the hopper-bottom and project beyond the hopper-wall on the discharge or delivery side thereof into close proximity with the belt or apron $A^4$. Each of the plates C is supported in such manner as to be movable transversely of the bed or table $A'$, and means are provided to impart a reciprocating movement thereto at a desired rate of speed—say from three hundred to five hundred vibrations per minute. As shown, each of said plates C is supported and reciprocating movement is imparted thereto in the following manner: Mounted in supporting arms or brackets $c'$ on each of the hoppers B, so as to be longitudinally movable, is a rod $C'$, to which the plate C is secured, so as to be movable therewith. As shown, the plate C is attached to cross-arms $c^2$, secured to the rod $C'$, said cross-arms being provided with holes to receive said rod $C'$ and being secured thereto by set-screws $c^3$. As shown, also, the plate C is attached to the cross-arms $c^2$ at its continuous side or edge only—that is, at its side or edge opposite to the free ends of the teeth or fingers $c$. The plate C is preferably made of resilient material, and the teeth or fingers $c$ will thus be spring-teeth. As shown, also, reciprocating movement transversely of the bed or table $A'$ is imparted to the plate C by means of suitable connection between the rod $C'$, a cam $C^2$, and a spring $C^3$, opposed to the action of said cam, the cam action operating to impart movement to said rod $C'$ in one direction and the spring $C^3$ in the other. As shown, the connection between each cam $C^2$ and the rod $C'$, actuated thereby, comprises a bell-crank $C^4$, pivoted to a rigid bracket on one of the hopper-supporting arms $B'$, one end of which projects into the path of travel of the cam $C^2$, being maintained in operative engagement therewith by the spring $C^3$, and the opposite end of which is connected to the rod $C'$ by means of a link $c^4$. As shown, also, the link or rod $c^4$ is mounted in a suitable bearing in the hopper-supporting arm $B'$, so as to be longitudinally movable, and is connected to said bell-crank by means of a yoke or fork $c^5$ on said bell-crank, which engages grooves $c^6$ on said link or rod $c^4$. Preferably, also, said link or rod $c^4$ is secured to the rod $C'$, so that said rod $C'$ will be longitudinally adjustable relatively to said link $c^4$, thus providing for adjusting the plate C transversely of its hopper B in order to regulate the limit of its movement in either direction. As shown, said rod $C'$ is secured in a hole formed in a boss $c^7$ on the link or rod $c^4$ by means of a set-screw $c^8$. In the preferable construction shown, also, sheet-metal plates $c^9$ $c^{10}$ $c^{11}$ are secured to the edges of the openings in the hopper-bottoms, against which the plates C bear, thus insuring tight and durable joints between said plates and hoppers. In order to facilitate the feeding of the contents of said hoppers to the belt or apron $A^4$, the plates $c^9$ at the discharge sides of the hoppers are set on edge, thus forming a very thin wall. Preferably, also, and as shown the plates C decline toward the discharge sides of the hoppers, so that reciprocating movement imparted to said plates will tend to work the contents of the hoppers toward the discharge sides thereof, thus further facilitating the feeding of the contents of said hoppers to the belt or apron $A^4$.

In order to catch fine particles of material which fall through the spaces between the teeth or fingers $c$ of the plates C and deliver them in desired position upon the belt or apron $A^4$, a continuous plate $C^5$ is provided beneath each plate C, said plates $C^5$ being secured to the cross-arms $c^2$ on the rods $C'$, so that they will be movable therewith, and the free edges thereof extending into close proximity to the belt or apron $A^4$ in substantially the same manner as the plates C. As shown, the plates $C^5$ are bent downwardly adjacent to their edges remote from the discharge side of the hopper-openings, thus forming spaces between said plates C $C^5$. In order to close these spaces at the lateral sides thereof, flanges $c^{12}$ are formed on the extreme cross-arms $c^2$, which extend upwardly flush with the tops of the plates C into contact with the edges of the hopper-openings.

Mounted in suitable bearings in the hopper-supporting arms $B'$ at the discharge sides of the hoppers are rolls D $D'$, the positions of which are such that their under sides will be in desired proximity to the belt or apron $A^4$ and such also that the free ends of the teeth or fingers $c$ will extend into close proximity to the surfaces of the rolls $D'$, which are next to the hoppers. Belts or aprons $D^2$ are also preferably applied to said rolls D $D'$. As shown, the cam-wheels $C^2$ are mounted so as to rotate freely on the shafts of the rolls D.

Positive rotary motion is imparted to the rolls $A^2$, $A^3$, D, and $D'$ and to the cam-wheels $C^2$ by suitable means, the relation being such that the adjacent sides of the belts or aprons $A^4$ and $D^2$ will travel in the same direction and at the same rate, the direction of travel being toward the rear of the machine, as indicated by the arrows in the drawings. In practice I find that the machine operates very successfully with the belts or apron $A^4$ and $D^2$ traveling at the rate of approximately twelve feet per minute. In the specific construction shown said rolls $A^2$, $A^3$, D, and $D'$ and the cam-wheels $C^2$ are driven by means of a driving-pulley E, mounted so as to rotate freely on the shaft of one of the rolls D. As shown, the cam-wheel $C^2$ on the shaft on which the driving-pulley E is mounted is secured to the hub of said driving-pulley so as to rotate therewith. The other cam-wheels $C^2$ are driven by means of chain belts $e$, adjusted to sprocket-wheels $E'$, secured to said cam-wheels $C^2$, so as to rotate therewith. The roll $A^3$ is driven from the rear cam-wheel $C^2$ by means of a chain belt $e'$, adjusted to sprocket-wheels $E^2$ $E^3$, of which the sprocket-wheel $E^2$ is driven from said rear cam-wheel $C^2$ and the sprocket-wheel $E^3$ is secured to the shaft of said roll $A^3$. The roll $A^2$ is driven from the roll $A^3$ by means of a chain belt $e^2$, adjusted to sprocket-wheels $E^4$, secured to the shafts of said rolls, and the rolls D D' are driven from the roll $A^3$ by means of a chain belt $e^3$, adjusted to a sprocket-wheel $E^5$ on the shaft of said roll $A^3$ and to sprocket-wheels $E^6$, secured to the shafts of said rolls D D'. To insure proper engagement of the chain belt $e^3$ with the teeth of the sprocket-wheels $E^6$, idle guide-wheels $E^7$ are provided, said guide-wheels being mounted so as to rotate freely on studs secured in the hopper-supporting arms B'. In order to avoid crowding of the driving mechanism, also, the rolls D D' are driven on the opposite side of the machine from the rolls $A^2$ $A^3$ and the cam-wheels $C^2$. In the preferable construction shown also the sprocket-wheel $E^2$ is not secured directly to the rear cam-wheel $C^2$; but is loosely mounted on a suitable stud $e^4$, rigidly secured in a hopper-supporting arm B', and is driven by means of change-gears comprising gears $e^5$ $e^6$, removably secured to the rear cam-wheel $C^2$ and to the sprocket $E^2$, respectively, and pinions $e^7$ $e^8$, revolubly mounted on a stud $e^9$, secured in said hopper-supporting arm B', said pinions $e^7$ $e^8$ being secured and adapted to rotate together and being also removable. With this construction it is obvious that the speed of the rolls $A^2$, $A^3$, D, and D', and thus the travel of the belts or aprons $A^4$ and $D^2$, may be varied almost as desired by using gears $e^5$ $e^6$ and pinions $e^7$ $e^8$ of proper relative sizes.

The operation of the machine, so far as described, is as follows, the description being limited to its operation for forming mica-board, which will well illustrate its intended use: A desired quantity of disintegrated mica laminæ having been placed in each of the hoppers B, the machine is started. The vibrations of the toothed plates C operate to work the laminæ of mica beneath the plates $c^9$ and to deliver them upon the apron $A^4$ in substantially flat position and in such manner that the edges of said scales or laminæ will overlap or interlock. It is obvious that each hopper will form a separate composite layer and that the final product will consist of as many such layers as there are hoppers delivering laminæ of mica to said apron. It is also obvious that the thickness of each layer will depend upon the rate of travel of the belts or aprons $A^4$ and $D^2$. The rolls D D' and the belts or aprons $D^2$ are adjusted so as to subject the layers formed by each hopper to a pressure which will operate to hold the scales or laminæ of which they are formed in position. Said rolls may appropriately be designated as "retaining-rolls." After passing from under the rolls D D' and the aprons $D^2$ a suitable bonding agent is applied to each layer, said bonding agent being adapted to cement the laminæ securely together. This bonding agent may be applied by hand or by means of suitable mechanism provided for the purpose. As shown, the machine is provided with mechanism for applying the bonding agent, which I will now describe.

Figure 11:
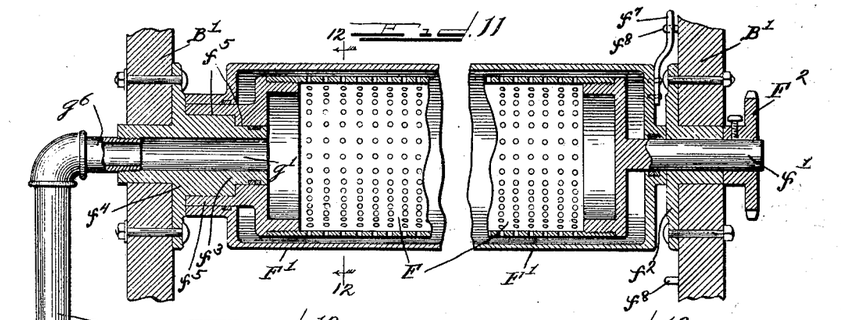
Figs. 11, 12, 13, and 14 are enlarged details of the devices for applying the bonding agent.
Figure 12:
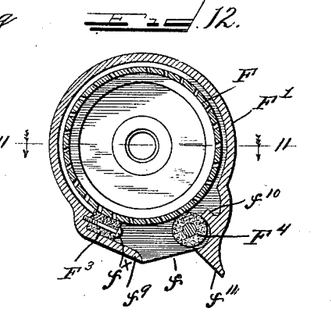
Figure 13:
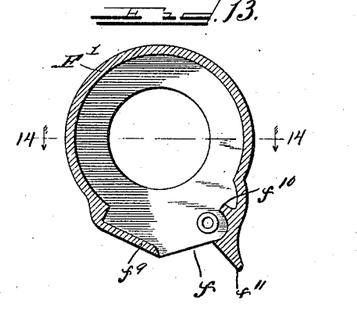
Figure 14:
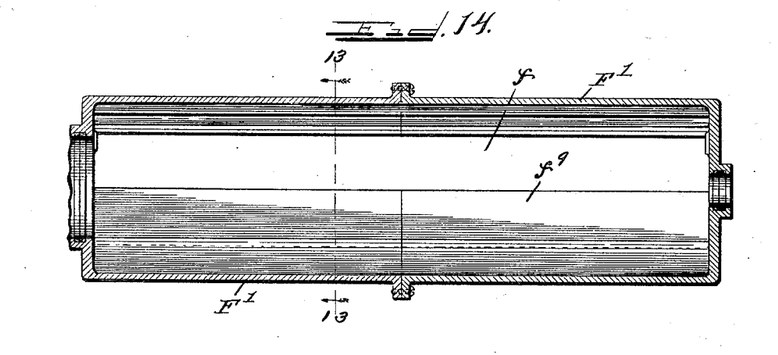

Revolubly mounted in suitable bearings at the rear of each set of rolls D D' is a perforated hollow cylinder F, which is inclosed by a rotatable casing or jacket F', provided with a transverse opening $f$, which will be on its under side when said device is in operative adjustment. As shown, the cylinders F are mounted at one side of the machine on trunnions $f'$, fitted to suitable bearings in blocks $f^2$, secured to the hopper-supporting arms B'. At the opposite side of the machine said hollow cylinders F are mounted on hubs or bosses $f^3$, formed on blocks or plates $f^4$, secured to the hopper-supporting arms B', suitable bearings formed in bosses $f^5$ on the heads of said hollow cylinders being fitted to said hubs or bosses $f^3$. The casings or jackets F' are mounted directly upon the cylinders F, being provided with suitable bearings in their ends or heads fitted to the trunnions $f'$ and to the hubs or bosses $f^5$, all as clearly shown in Fig. 11 of the drawings. For purposes of economy and convenience in construction the heads of the cylinder F are made separate therefrom and are threaded into the ends thereof. For similar reasons and to facilitate assembling the same over the cylinders F the casings or jackets F' are made in sections secured together by means of bolts inserted through flanges formed on the abutting ends thereof, as clearly shown in Fig. 14 of the drawings.

During the operation of the machine continuous rotary motion is imparted to the perforated cylinders F by means of chain belts $f^6$, adjusted to sprocket-wheels $F^2$, secured to the trunnions $f'$ of said cylinders and to the shafts of the rolls D. The casings or jackets are rotatable by means of levers $f^7$ thereon and are adapted to be locked in desired rotated positions by suitable means provided for the purpose. As shown, the levers $f^7$ are spring-levers and are adapted to engage rigid stops on the hopper-supporting arms B', said stops consisting of pins $f^8$, secured in said arms B' in proper position. Each lever $f^7$ is adapted to be engaged with or disengaged from said pins by properly springing the same. The relative positions of said levers $f^7$ and pins $f^8$ are such that when locked in one position the openings $f$ in said cylinders will be on the under sides thereof, allowing the contents of said cylinders F to discharge freely directly upon the belt or apron $A^4$ or a layer of material resting thereon, and when locked in the other that said jackets or casings will inclose the under sides of said perforated cylinders F, so as to catch any drippings therefrom.

In order to close the spaces between the cylinders F and the casings or jackets F' at the edges of the openings $f$, suitable packings are provided. As shown, the spaces between said cylinders F and said jackets F' on one side of said openings $f$ are packed, by means of strips $F^3$, of felt, rubber, composition, or other suitable material, secured to said casing or jacket F'. As shown, said strips $F^3$ are secured to said casing or jacket by screws $f^\times$ and at their outer sides rest against lips $f^9$, formed on said casing, said screws $f^\times$ extending substantially parallel with lines tangent to said cylinders F. Said strips $F^3$ being elastic, it is obvious that setting up the screws $f^8$ will operate to expand said strips $F^3$ transversely, thus affording convenient means for adjusting the strength of the contact of said strips with the surfaces of said cylinders F. On the opposite sides of said openings $f$ the spaces between said cylinders F and casings or jackets F' are closed or packed, by means of rollers $F^4$, likewise made of felt, rubber, composition, or other suitable material, the shafts of which are mounted so as to rotate freely in suitable bearings in the ends of the casings or jackets F'. The surfaces of the rollers $F^4$ bear against the surfaces of the cylinders F and also against projections $f^{10}$ on the casings or jackets F'. The lips $f^9$ and projections $f^{11}$ on the opposite sides of the openings $f$ from said lips $f^9$ operate to prevent splashing of the sprays or jets of the bonding agent as it is discharged through the perforations of the cylinders F.

A bonding agent under pressure is supplied to the cylinders F from a suitable source of supply. As shown, the bonding agent is supplied to said cylinders from a tank G, located beneath the machine, through pipes $g$, which connect said tank and said cylinders. As shown, said pipes $g$ communicate with the interiors of the cylinders F through openings $g'$, formed in the bearing-plates $f^4$, on which said cylinders are mounted at one side, as clearly shown in Fig. 11 of the drawings. The tank G is provided with an air-pump G', whereby a desired pressure may be created in said tank to force the bonding agent from said tank through the pipes $g$ into the cylinders F and to maintain a desired pressure in said cylinders. As shown, also, an equalized pressure is maintained in said tank G by means of a weight $g^2$, applied to the handle or operating-lever of the pump G'.

The discharge of the bonding agent from the tank G is controlled by means of a stop-cock $g^3$ in the section of pipe $g^4$, leading from said tank. Stop-cocks $g^5$ are likewise provided in the sections of pipe $g^6$, which communicate directly with the cylinders F, thus making provision for cutting off the supply of bonding agent from each of said cylinders separately, if desired. A sufficient pressure—say twenty pounds per square inch—will be maintained in said tank to discharge the bonding agent from the cylinders F through the perforations therein in the form of sprays or jets.

The operation of the bond-applying mechanism is as follows: When it is desired to apply the bonding agent, the casings F are first turned so that the openings $f$ therein will be on the under sides of the cylinders F. A desired pressure having been produced in the tank G, the cocks $g^3$ and $g^5$ are opened, so as to allow the bonding agent to flow into the cylinders F, whence it will be discharged through the perforations therein, which are in register with the openings $f$, onto the layer of material on the belt or apron $A^4$ as it passes under said cylinders F. The packings $F^3$ $F^4$, and particularly the stationary packing-strips $F^3$, rubbing against the surfaces of the cylinders F as they rotate, operate to prevent clogging of the perforations in said cylinders.

When it is desired to stop the machine or for any other reason to stop the delivery of the bonding agent to the cylinders F, the stop-cock $g^3$ is turned to close the section of pipe $g^4$, which will stop the delivery of the bonding agent to said cylinders, and the casings F' are turned so that the openings $f$ therein will be on the upper sides of the cylinders F, thus preventing the bonding agent remaining in said cylinders and casings from running out onto the apron $A^4$. This is necessary, as the cylinders F and casings F' will be full of the bonding agent when the stop-cock $g^3$ is closed. In case it is desired to close only part of the cylinders F this can be done by means of the stop-cocks $g^5$ in the sections of pipe $g^6$, the casings F' being turned, as before, to prevent the bonding agent remaining in said cut-off cylinders and casings from running out.

Figure 1:
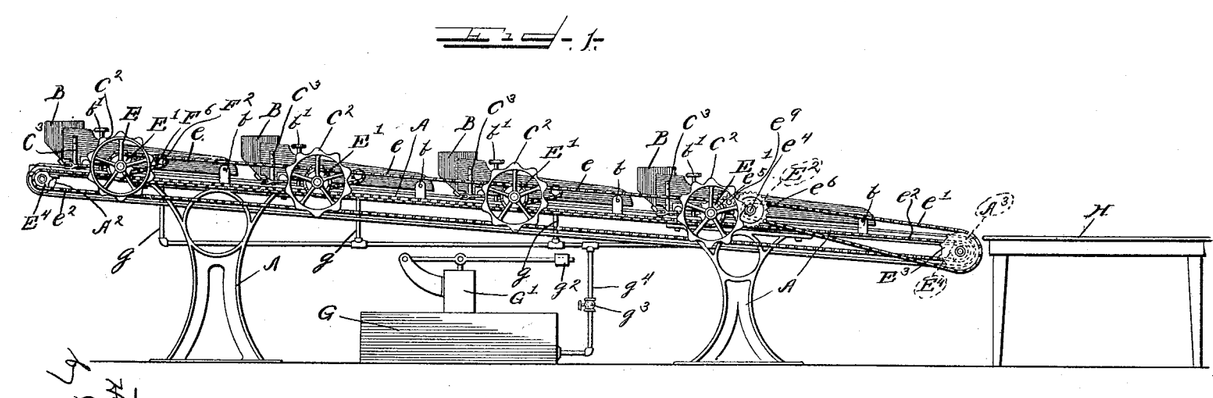
Figure 1 is an elevation of one side of the machine.
Figure 2:
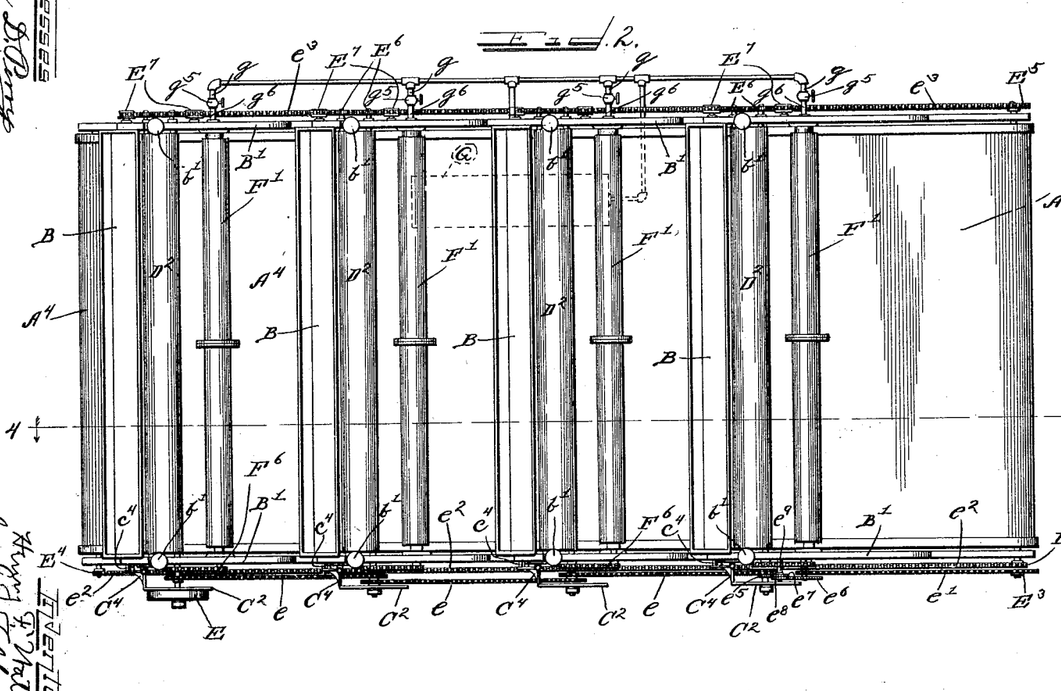
Fig. 2 is a top plan view thereof.
Figure 3:
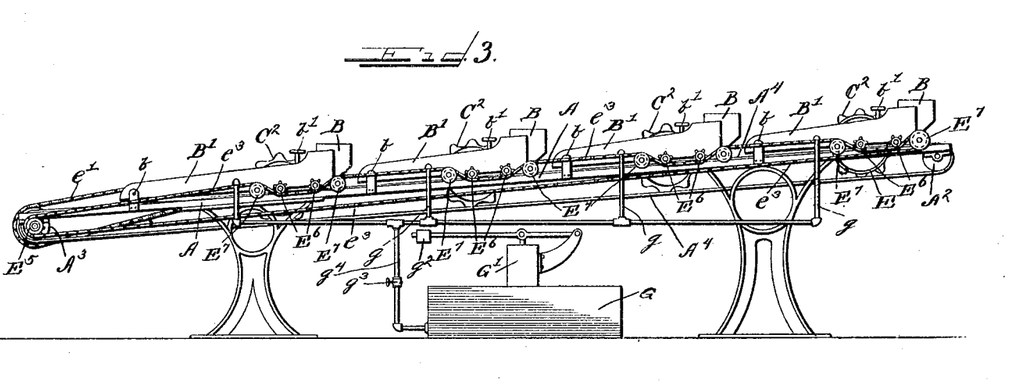
Fig. 3 is an elevation of the opposite side of the machine from that shown in Fig. 1.
Figure 4:
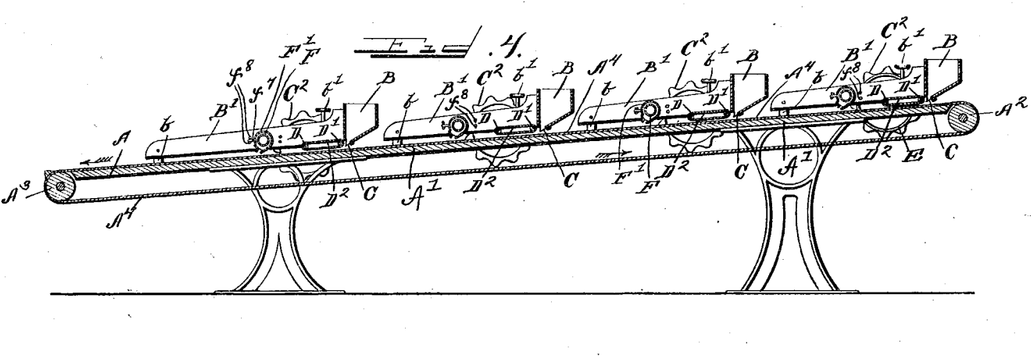
Fig. 4 is a vertical longitudinal sectional view on the line 4 4 of Fig. 2.
Figure 5:
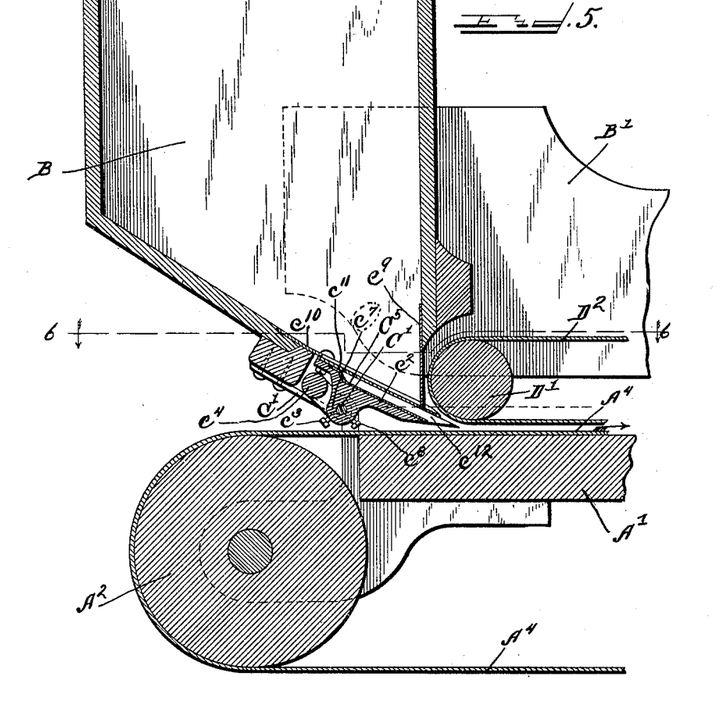
Fig. 5 is an enlarged detail sectional view of the hopper and adjunctive parts.
Figure 6:
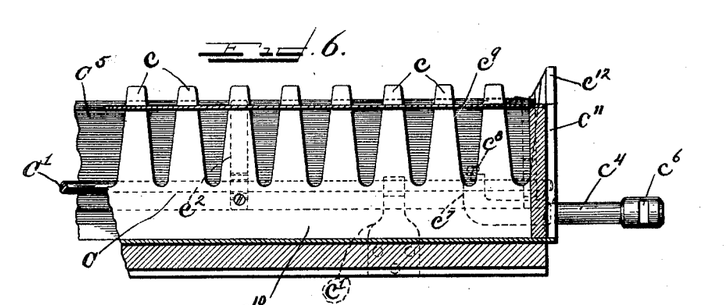
Fig. 6 is an enlarged plan section on the line 6 6 of Fig. 5.
Figures 7, 8, 9, 10:
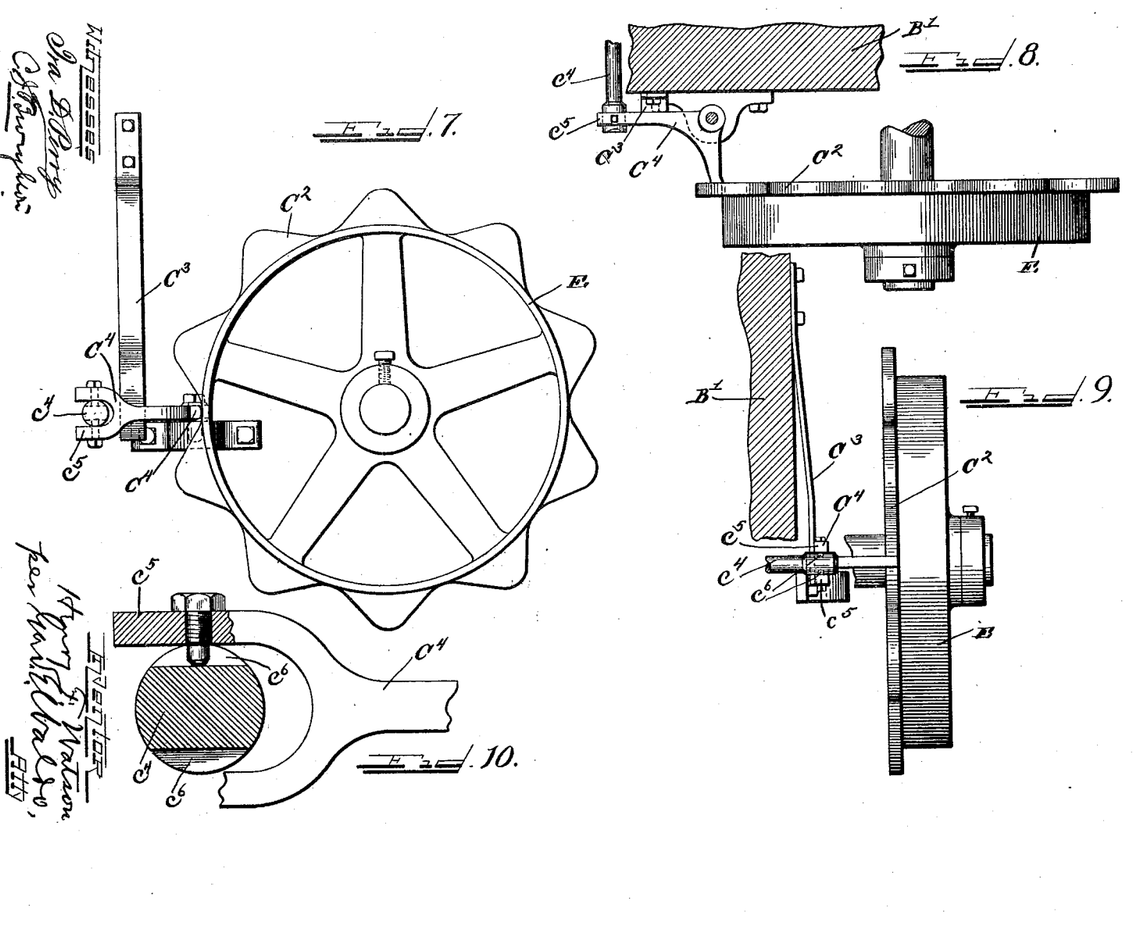
Figs. 7, 8, 9, and 10 are enlarged details of the feed-actuating mechanism.

With a machine like that shown the product will be delivered from the rear end of the machine in the form of a continuous sheet and may be cut into desired lengths by any suitable means. (Not shown.) As shown, the product as it comes from the machine is delivered upon a table H. (See Fig. 1 of the drawings.)

While I have in the drawings shown a plurality of hoppers and layer-forming mechanisms, my invention contemplates the use of a single hopper, with its adjunctive mechanism, the different layers of the final product being formed by successive passages thereof beneath said hopper. With this form of machine the table A' and the apron $A^4$ will be extended on both sides of the hopper to form a support for said product as it is transferred from the rear to the front side of said hopper.

The final product of a machine of my invention is compressed by means of a suitable press having steam-heated heads in the same manner as the hand-laid product is pressed, the heat of the heads operating to soften the bonding agent.

As shown, the bed or table A' of the machine declines from its front to its rear end. This position of the bed somewhat facilitates the passage of the product therethrough; but I do not consider it essential, and my invention contemplates equally setting said table level.

I claim—

1. A machine for making mica-board, or the like, comprising a movable support, means to impart movement thereto, a hopper above said support, a feed mechanism adapted to deliver the contents of said hopper upon said support, a roll revolubly mounted above said support at the delivery side of the hopper, said hopper and roll being adjustable toward and from said support and means for so adjusting said hopper and roll, substantially as described.

2. A machine for making mica-board, or the like, comprising a movable support, means to impart movement to said support, pivoted arms, a hopper supported thereon, means to adjust the free ends of said arms toward and from said movable support, and a feed mechanism adapted to deliver the contents of said hopper upon said movable support, substantially as described.

3. A machine for making mica-board, or the like, comprising a movable support, means to impart movement to said support, pivoted arms, a hopper supported upon said arms, a roll revolubly mounted in said arms at the discharge side of said hopper, means to adjust the free ends of said arms toward and from said movable support and a feed mechanism adapted to deliver the contents of said hopper upon said movable support, substantially as described.

4. A machine for making mica-board, or the like, comprising a movable support, means to impart movement to said support, a hopper above said support provided with an opening in its under side, a fingered plate supported in contact with the edges of said opening, and means to impart reciprocating movement to said plate, substantially as described.

5. A machine for making mica-board, or the like, comprising a movable support, a hopper above said support provided with an opening in its under side, a fingered plate supported in contact with the edges of said opening, the hopper-wall on the discharge side thereof being thin at its lower edge, and means to impart reciprocating movement to said plate, substantially as described.

6. A machine for making mica-board, or the like, comprising a movable support, means to impart movement to said support, a hopper above said support provided with an opening in its under side, a fingered plate supported in contact with the edges of the opening in said hopper in such position that it declines toward the discharge side thereof, and means to impart reciprocating movement to said plate, substantially as described.

7. A machine for making mica-board, or the like, comprising a movable support, means to impart movement to said support, a hopper above said support provided with an opening in its under side, a fingered plate supported in contact with the edges of said opening, a plate supported beneath said fingered plate and means to impart reciprocating movement to both of said plates, substantially as described.

8. A machine for making mica-board, or the like, comprising a movable support, means to impart movement to said support, a hopper above said support provided with an opening in its under side, a fingered plate supported in contact with the edges of the opening in said hopper, the means for supporting said fingered plate comprising a rod fitted to and longitudinally movable in suitable bearings in brackets secured to said hopper and means applied to said rod to impart reciprocating movement to said fingered plate, substantially as described.

9. A machine for making mica-board, or the like, comprising a movable support, means to impart movement to said support, a hopper above said support provided with an opening in its under side, a fingered plate supported in contact with the edges of said hopper-opening, the means for supporting said fingered plate comprising a rod fitted to and longitudinally movable in brackets on said hopper, and means to impart reciprocating movement to said plate, said means comprising a cam-wheel and a pivoted bell-crank, one arm of which is connected to said plate-supporting rod and the other arm of which projects into the path of travel of said cam-wheel, substantially as described.

10. A machine for making mica-board, or the like, comprising a movable support, means to impart movement to said support, a hopper above said support provided with an opening in its under side, a fingered plate supported in contact with the edges of said hopper-opening, the means for supporting said fingered plate comprising a rod fitted to and longitudinally movable in brackets on said hopper and means to impart reciprocating movement to said plate, said means comprising a pivoted bell-crank, one arm of which is connected to the rod on which said fingered plate is supported and the other end of which projects into the path of travel of a cam-wheel, means to rotate said cam-wheel and a spring applied to said bell-crank adapted to move it in the opposite direction from said cam-wheel, substantially as described.

11. A machine for making mica-board, or the like, comprising a movable support, means to impart movement to said support, a hopper above said support provided with an opening in its under side, a fingered plate supported in contact with the edges of said hopper-opening, the means for supporting said fingered plate comprising a rod fitted to and longitudinally movable in brackets on said hopper, and means to impart reciprocating movement to said fingered plate, said means comprising a link adjustably connected to said fingered plate, substantially as described.

12. A machine for making mica-board, or the like, comprising a movable support, means to impart movement to said support, a hopper above said support provided with an opening in its under side, a fingered plate supported in contact with the edges of said hopper-opening, the means for supporting said plate comprising a rod fitted to and longitudinally movable in brackets on said hopper and cross-arms on said rod to which said fingered plate is attached, substantially as described.

13. A machine for making mica-board, or the like, comprising a movable support, means to impart movement to said support, a hopper above said support provided with an opening in its under side, a fingered plate supported in contact with the edges of said hopper-opening, a plate supported beneath said fingered plate, the means for supporting said plates comprising a rod supported in brackets and cross-arms on said rod to which said plates are attached and means for imparting reciprocating movement to said plates, substantially as described.

14. A machine for making mica-board, or the like, comprising a movable support, means to impart movement thereto, a hopper above said support provided with an opening in its under side, a plate supported in contact with the edges of said hopper-opening, fingers on said plate which extend beyond the wall of said hopper on the discharge side thereof and means to impart reciprocating movement to said plate, substantially as described 15. A machine for making mica-board, or the like, comprising a movable support, means to impart movement thereto, a hopper above said support provided with an opening in its under side, a plate supported in contact with the edges of said opening, fingers on said plate which extend beyond the wall of said hopper on the discharge side thereof, a plate beneath said fingered plate and means to impart reciprocating movement to said plates, substantially as described.

16. A machine for making mica-board, or the like, comprising a movable support, means to impart movement thereto, a plurality of hoppers above said support provided with openings in their under sides, fingered plates supported in contact with the edges of the openings in said hoppers, plates beneath said fingered plates and means to impart reciprocating movement to said plates, substantially as described.

17. A machine for making mica-board, or the like, comprising a movable support, means to impart movement thereto, a hopper above said support, a retaining-roll revolubly mounted above said support at the rear of said hopper, said hopper being provided with an opening in its under side, a plate supported in contact with the edges of the opening in said hopper, fingers on said plate which extend beyond the wall of said hopper and into close proximity to the under side of said retaining-roll and means to impart reciprocating movement to said plate, substantially as described.

18. A machine for making mica-board, or the like, comprising a movable support, means to impart movement thereto, a hopper above said support, a retaining-roll revolubly mounted above said support at the rear of said hopper, said hopper being provided with an opening in its under side, a plate supported in contact with the edges of the opening in said hopper, fingers on said plate which extend beyond the hopper-wall and into close proximity to the under side of said retaining-roll, a plate beneath said fingered plate and means to impart reciprocating movement to said plates, substantially as described.

19. The combination with a hopper provided with an opening in its under side of means to feed the contents of said hopper therefrom, said means comprising a fingered plate supported in contact with the edges of said hopper-opening, a plate supported beneath said fingered plate and means to impart reciprocating movement to said plates, substantially as described.

20. A machine for making mica-board, or the like, comprising a movable support, means to impart movement to said support, a hopper above said support, a feed mechanism adapted to deliver the contents of said hopper upon said support and means for applying a bonding agent to the material delivered upon said support, said means comprising a perforated cylinder the interior of which communicates with a source of supply, a casing which incloses said perforated cylinder provided with an opening in its under side and means to pack or close the space between said cylinder and casing at the edges of the opening in said casing, substantially as described.

21. A machine for making mica-board, or the like, comprising a movable support, means to impart movement to said support, a hopper above said support, a feed mechanism adapted to deliver the contents of said hopper upon said support and means for applying a bonding agent to the material delivered upon said support, said means comprising a perforated cylinder the interior of which communicates with a suitable source of supply, a rotatable casing which incloses said perforated cylinder, said casing being provided with an opening adapted to be brought beneath or above said perforated cylinder by turning said casing and means to close or pack the space between said cylinder and casing at the edges of the opening in said casing, substantially as described.

22. A machine for making mica-board, or the like, comprising a movable support, means to impart movement to said support, a hopper above said support, a feed mechanism adapted to deliver the contents of said hopper upon said support and means for applying a bonding agent to the material delivered from said hopper upon said support, said means comprising a revoluble perforated cylinder the interior of which communicates with a source of supply, a rotatable casing or jacket which incloses said perforated cylinder, said casing being provided with an opening adapted to be brought beneath or above said perforated cylinder by turning said casing, packings which close the space between said cylinder and casing at the edges of the opening in said casing and means to rotate said cylinder, substantially as described.

23. A machine for making mica-board, or the like, comprising a movable support, means to impart movement to said support, a hopper above said support, a feed mechanism adapted to deliver the contents of said hopper upon said support and a bond-applying mechanism, comprising a revoluble perforated cylinder the interior of which communicates with a source of supply, means to rotate said cylinder, a rotatable casing which incloses said cylinder, said casing being provided with an opening which may be brought above or below said cylinder by turning said casing and packings which close the space between said cylinder and casing at the edges of the opening in said casing, comprising a strip of suitable material secured to said casing so that it will rub on the surface of said cylinder, substantially as described.

24. The combination of a revoluble perforated cylinder the interior of which communicates with a source of fluid-supply, means to rotate said cylinder and a rotatable casing which incloses said cylinder, said casing being provided with an opening adapted to be brought above or beneath said cylinder by turning said casing, substantially as described.

25. A machine for making mica-board, or the like, comprising a movable support, means to impart movement thereto, a plurality of hoppers above said support provided with openings in their under sides, fingered plates supported in contact with the edges of the openings in said hoppers and means to impart reciprocating movement to said plates, substantially as described.

26. A machine for making mica-board, or the like, comprising a movable support, means to impart movement thereto, a plurality of hoppers above said support disposed at intervals along the same, means to feed the contents of said hoppers upon said movable support and means located at the delivery side of said hoppers for applying a bonding agent to the material delivered upon said support from said hoppers, substantially as described.

In testimony that I claim the foregoing as my invention I have hereunto set my hand this 13th day of February, 1901.

HENRY F. WATSON.

Witnesses:
BYRON B. CARTER,
IRA D. PERRY.